United States Patent
Sun et al.

(10) Patent No.: US 12,519,142 B2
(45) Date of Patent: Jan. 6, 2026

(54) ULTRA-THIN LITHIUM FILM LAMINATE AND METHOD FOR PREPARING THE SAME

(71) Applicant: China Energy Lithium Co., Ltd, Tianjin (CN)

(72) Inventors: Zhaoyong Sun, Tianjin (CN); Qingna Huan, Tianjin (CN); Xiuna Han, Tianjin (CN); Deyu Kong, Tianjin (CN)

(73) Assignee: China Energy Lithium Co., Ltd., Tianjin (CN)

( * ) Notice: Subject to any disclaimer, the term of this patent is extended or adjusted under 35 U.S.C. 154(b) by 481 days.

(21) Appl. No.: 17/756,690

(22) PCT Filed: Dec. 16, 2021

(86) PCT No.: PCT/CN2021/138805
§ 371 (c)(1),
(2) Date: May 31, 2022

(87) PCT Pub. No.: WO2023/015804
PCT Pub. Date: Feb. 16, 2023

(65) Prior Publication Data
US 2024/0204262 A1    Jun. 20, 2024

(30) Foreign Application Priority Data
Aug. 9, 2021   (CN) .......................... 202110905800.8

(51) Int. Cl.
*H01M 10/0525* (2010.01)
*H01M 4/04* (2006.01)
(Continued)

(52) U.S. Cl.
CPC ..... *H01M 10/4235* (2013.01); *H01M 4/0435* (2013.01); *H01M 4/134* (2013.01);
(Continued)

(58) Field of Classification Search
CPC ...... H01M 10/052; H01M 4/13; H01M 4/382; H01M 4/405
See application file for complete search history.

(56) References Cited

U.S. PATENT DOCUMENTS

| 11,532,808 B2 * | 12/2022 | Brevnov | ............... H01M 4/043 |
| 2015/0010811 A1 * | 1/2015 | Egorov | ............ H01M 10/0567 429/188 |

(Continued)

FOREIGN PATENT DOCUMENTS

| CN | 107123785 A | 9/2017 |
| CN | 109328413 A | 2/2019 |

(Continued)

OTHER PUBLICATIONS

EPO machine translation of CN 210123779 U (Year: 2020).*
(Continued)

*Primary Examiner* — Kevin E Yoon
(74) *Attorney, Agent, or Firm* — Osha Bergman Watanabe & Burton LLP

(57) ABSTRACT

The present disclosure provides an ultra-thin lithium film laminate and a method for preparing the same. The laminate comprises: a supporting layer, and an ultra-thin lithium film on at least one surface of the supporting layer and bound to the supporting layer, wherein the ultra-thin lithium film is a uniform thin film having a through-hole with a pore size ranging from 5 to 200 μm and having a uniform thickness ranging from 0.5 to 20 μm, with a thickness tolerance within ±0.5 μm; wherein there is a solid electrolyte interface layer at an interface between the ultra-thin lithium film and the supporting layer, and an adhesion between the ultra-thin lithium film and the supporting layer is in a range from 0.1 to 15 N·m$^{-1}$.

8 Claims, 4 Drawing Sheets

(51) Int. Cl.
*H01M 4/13* (2010.01)
*H01M 4/134* (2010.01)
*H01M 4/1395* (2010.01)
*H01M 4/38* (2006.01)
*H01M 4/40* (2006.01)
*H01M 10/42* (2006.01)
*H01M 50/417* (2021.01)
*H01M 50/46* (2021.01)
*H01M 4/02* (2006.01)

(52) U.S. Cl.
CPC ......... *H01M 4/1395* (2013.01); *H01M 4/382* (2013.01); *H01M 10/0525* (2013.01); *H01M 50/417* (2021.01); *H01M 50/46* (2021.01); *H01M 2004/021* (2013.01)

(56) References Cited

U.S. PATENT DOCUMENTS

| | | | |
|---|---|---|---|
| 2017/0244098 A1* | 8/2017 | Duong | H01M 4/364 |
| 2017/0365854 A1 | 12/2017 | Gopalakrishnannair et al. | |
| 2018/0254464 A1 | 9/2018 | Sakurai et al. | |
| 2019/0140267 A1 | 5/2019 | Gopalakrishnan Nair et al. | |

FOREIGN PATENT DOCUMENTS

| | | | | |
|---|---|---|---|---|
| CN | 109390633 A | | 2/2019 | |
| CN | 109638235 A | * | 4/2019 | ......... H01M 4/0435 |
| CN | 109786750 A | | 5/2019 | |
| CN | 110729451 A | | 1/2020 | |
| CN | 210123779 U | * | 3/2020 | |
| CN | 111987278 A | | 11/2020 | |
| CN | 112151758 A | | 12/2020 | |
| CN | 112786842 A | | 5/2021 | |
| CN | 112820858 A | | 5/2021 | |
| CN | 113036077 A | | 6/2021 | |
| CN | 113036079 A | | 6/2021 | |
| CN | 213864531 U | | 8/2021 | |
| CN | 113363456 A | | 9/2021 | |
| EP | 1093672 A1 | | 4/2001 | |
| JP | 2021502671 A | | 1/2021 | |
| KR | 20190009844 A | | 1/2019 | |
| WO | 2021123151 A1 | | 6/2021 | |

OTHER PUBLICATIONS

International Search Report issued in International Application No. PCT/CN2021/138805 mailed on Mar. 28, 2022 (5 pages).
Written Opinion issued in International Application No. PCT/CN2021/138805 mailed on Mar. 28, 2022 (9 pages).
Notice of Reasons for Refusal issued in Japanese Application No. 2022-570587 mailed on Jan. 9, 2024 (6 pages).
First Office Action issued in the corresponding Chinese Application No. 202110905800.8 with English translation dated Sep. 15, 2021 (13 pages).
Notice of allowance issued in corresponding Chinese Application No. 202110905800.8 with English translation dated Oct. 8, 2021 (5 pages).
Office Action issued in corresponding Korean patent application No. 10-2022-7039911, dated Jan. 3, 2025 (16 pages).
European Search Report issued in corresponding European Patent Application No. 21895919.5, dated Oct. 30, 2024 (18 pages).

* cited by examiner

ULTRA-THIN LITHIUM FILM LAMINATE AND METHOD FOR PREPARING THE SAME

TECHNICAL FIELD

The present disclosure relates to the technical field of energy storage, and particularly to an ultra-thin lithium film laminate which can be used in secondary batteries and a method for preparing the same.

BACKGROUND

Lithium batteries are widely used in the fields of aerospace, computer, mobile communication equipment, robot, and electric vehicle due to their advantages of high energy density, long cycle life, and wide applicable temperature range. With the development of society and the progress of science and technology, the requirements for the energy density and cycle life of lithium batteries are increasing. At present, it is difficult for lithium-ion batteries simply with graphite as the negative electrode to meet the expectations of the society, and thus it is necessary to develop novel positive and negative electrode materials with higher specific capacities. For a negative electrode material, the prelithiation procedure can effectively improve the specific energy and lifetime of the battery. Lithium metal has a high specific capacity (3860 mAh/g, 10 times higher than that of graphite negative electrode) and the lowest redox potential (−3.04 V VS standard hydrogen potential). On one hand, the prelithiation treatment on a traditional graphite or silicon-carbon negative electrode with a modified metallic lithium can improve the first coulombic efficiency of the battery and increase the specific energy of the battery. On the other hand, the surface modification layer can effectively reduce the loss of metallic lithium and extend the cycle life of the battery. As a result, the lithium-ion battery can be used in a wide range of applications.

Although the prelithiation (lithium compensation) has such advantages, it is necessary to precisely control the amount of lithium supplemented in the battery and maintain the stability of the lithium-compensation material. In view of this, higher requirements are put forward for the negative electrode prelithiation. At present, the positive electrode materials used in existing lithium-ion batteries are all lithium-containing materials (such as lithium cobaltate, lithium iron phosphate, and ternary materials). The lithium contained in the positive electrode can meet the requirements for the charging and discharging of lithium-ion batteries. Thus, the lithium compensation for the negative electrode only needs to provide a small amount of lithium to compensate for the loss of lithium during the cycle process so as to improve the energy density and cycle life of the battery. Since the negative electrode has a very small amount of pre-intercalated lithium, the lithium film used for lithium compensation typically has a thickness of only 0.5 μm to 15 μm. In the Chinese patent application CN201610102992.8 of Contemporary Amperex Technology Co. Limited (CATL), lithium powders are sprinkled on the surface of an electrode sheet and roll pressed for prelithiation during the lithium compensation process, where a very small amount of lithium is used. However, this lithium compensation method cannot achieve precise control of the amount of lithium supplemented. Also, the method has a complex process and high cost. More importantly, it is very difficult to control the safety. The Chinese patent application CN112151758A of China Energy Lithium Co. Ltd (CEL) relates to an ultra-thin lithium film preform and a method for preparing the same, and proposes a method for supplementing lithium with an ultra-thin lithium film, which can effectively solve the problem of precise control of the amount of lithium supplemented by metallic lithium. However, the stability of metallic lithium needs to be further optimized. In view of this, there is a need for a technology which can not only control the amount of lithium supplemented, but also increase the stability, as well as achieving long cycle life and high energy density of a battery.

SUMMARY

The inventors have surprisingly found that by arranging on the surface of a supporting layer a functionalized layer capable of reacting with metallic lithium to form an artificial solid electrolyte interface layer (an artificial SEI layer), not only an ultra-thin lithium film used in the negative electrode prelithiation can be bound to the supporting layer with a suitable adhesion (where the adhesion level can ensure that the ultra-thin lithium film is attached to the supporting layer, and also can be easily transferred from the supporting layer to another substrate such as the negative electrode of a lithium battery), but also the artificial SEI layer remains on the ultra-thin lithium film when it is transferred from the supporting layer to another substrate, such that the metallic lithium film can be effectively protected, improving the stability and cycle performance of the battery. Based on these findings, the inventors have completed the invention.

Therefore, in one aspect, the present disclosure is intended to provide an ultra-thin lithium film laminate comprising: a supporting layer, and an ultra-thin lithium film on at least one surface of the supporting layer and bound to the supporting layer, wherein the ultra-thin lithium film is a uniform thin film having a through-hole with a pore size ranging from 5 to 200 μm and having a uniform thickness ranging from 0.5 to 20 μm, with a thickness tolerance within ±0.5 μm; wherein there is a solid electrolyte interface (SEI) layer at an interface between the ultra-thin lithium film and the supporting layer, and an adhesion between the ultra-thin lithium film and the supporting layer is in a range from 0.1 to 15 N·m$^{-1}$.

The ultra-thin lithium film laminate of the present disclosure is a continuous or intermittent laminate strip, which has through-holes, is supported by the supporting layer (a substrate for thin film), and has adjustable width and thickness (by controlling the size of the lithium film and the pressure).

In the present disclosure, the ultra-thin lithium film is a uniform thin film, meaning that the ultra-thin lithium film has a complete thin film shape (having no obvious wrinkle or deformation, and having a neat edge) and has a uniform thickness. Preferably, the ultra-thin lithium film has through-holes which are uniformly distributed throughout the lithium film.

Optionally, the ultra-thin lithium film of the present disclosure is continuous or intermittent in a length direction, or is continuous or intermittent in a width direction.

Optionally, the lithium film intermittent in the length direction comprises a blank region and a metallic lithium layer region both with a controllable length, wherein the metallic lithium layer region has a length in a range from 1 to 2000 mm, and the blank region has a length in a range from 1 to 200 mm, and preferably 1 to 100 mm.

Optionally, the lithium film intermittent in the width direction comprises a lithium film portion with a width ranging from 1 to 200 mm and a lithium film-free portion with a spacing ranging from 0.5 to 10 mm.

Optionally, the lithium film of the ultra-thin lithium film laminate has a bright and metallic silver-white surface, and has a lithium content of 99.90-99.95%. The bulk lithium film may have a lithium element content of 99.95%-99.99%. The lithium film has a thickness in a range from 0.5 to 15 μm, preferably from 1 to 10 μm, and more preferably of 5 μm or less, with a thickness tolerance of ±0.5 μm, and preferably ±0.1 μm.

Optionally, the ultra-thin lithium film has uniformly distributed through-holes with a pore size ranging from 5 to 200 μm.

Optionally, the through-hole of the ultra-thin lithium film may have a pore size ranging from 10 to 50 μm.

Optionally, the ultra-thin lithium film has a porosity ranging from 0.1% to 20%, preferably from 0.1% to 10%, and more preferably from 0.5% to 5%.

Optionally, the through-hole of the ultra-thin lithium film has a circular or quasi-circular shape, with a hole spacing ranging from 5 to 1000 μm, preferably from 5 to 200 μm, and more preferably from 5 to 50 μm.

Optionally, a material for forming the ultra-thin lithium film comprises metallic lithium or a lithium alloy, wherein the lithium alloy is an alloy of lithium with one or more of silicon, magnesium, aluminum, indium, boron, tin, gallium, yttrium, silver, copper, lead, bismuth, sodium, carbon, germanium, titanium, chromium, cobalt, tungsten, iron, niobium, nickel, gold, barium, cadmium, cesium, calcium, manganese, nitrogen, platinum, sulfur, thallium, strontium, tellurium, zinc, antimony, and zirconium.

Optionally, a material for the supporting layer comprises: a polymer, such as nylon, cellulose, a high-strength thin-film polyolefin (such as polyethylene, polypropylene, and polystyrene), and a polyester; an inorganic oxide, such as aluminum oxide; an inorganic conductor, such as graphite, carbon nanotubes, and graphene; and a metal current collector, such as copper and aluminum. The supporting layer may be a single layer or a multi-layer laminate.

Optionally, the supporting layer has a thickness ranging from 1 to 500 μm, preferably from 5 to 100 μm, and more preferably from 10 to 50 μm.

Optionally, the SEI layer at the interface between the ultra-thin lithium film and the supporting layer comprises one or more of lithium carbonate, lithium oxide, lithium hydroxide, lithium nitride, lithium fluoride, lithium phosphate, and alkyl lithium.

Optionally, a stress-adjusting material is further provided at the interface between the ultra-thin lithium film and the supporting layer, wherein the stress-adjusting material comprises one of poly(dimethylsiloxane), hydrogen-containing silicone oil, punching shear oil, liquid paraffin, methyl silicone oil, emulsified methyl silicone oil, hydrogen-containing methyl silicone oil, silicone grease, and polyethylene wax, or a combination thereof.

Optionally, an adhesion between the supporting layer and the ultra-thin lithium film is in a range from 1 to 10 N·m$^{-1}$, and preferably from 1 to 5 N·m$^{-1}$. The adhesion between the supporting layer and the ultra-thin lithium film can ensure that the ultra-thin lithium film is stably bound to the supporting layer, and can also be easily transferred from the supporting layer to another substrate such as the negative electrode of a lithium battery.

In another aspect, the present disclosure is intended to provide a method for preparing the above-mentioned ultra-thin lithium film laminate, comprising:

forming a functionalized layer on at least one surface of a supporting layer, wherein the functionalized layer contains a material capable of reacting with metallic lithium to form an SEI layer; and rolling and laminating a metallic lithium strip with a thickness ranging from 10 to 250 μm onto a surface of the supporting layer with the functionalized layer formed by a roll-to-roll process, to obtain the ultra-thin lithium film laminate.

Optionally, the functionalized layer is formed by applying a dispersion containing a material capable of reacting with metallic lithium to form an SEI layer onto at least one surface of the supporting layer by spray coating, dip coating, transfer coating, extrusion coating, blade coating, curtain coating, or screen printing.

Optionally, the material capable of reacting with metallic lithium to form the SEI layer comprises at least one selected from the group consisting of perfluoro-n-pentane, perfluorotriamylamine, polyphosphoric acid, polyvinylidene fluoride, lithium hexafluorophosphate, copper fluoride, fluoroethylene carbonate, ethylene carbonate, dimethyl carbonate, hydrofluoric acid, ethyl methyl carbonate, polyvinyl chloride, polyacrylonitrile, and polyethylene oxide.

Optionally, the dispersion further contains a material selected from the group consisting of poly(dimethylsiloxane), hydrogen-containing silicone oil, punching shear oil, liquid paraffin, methyl silicone oil, emulsified methyl silicone oil, hydrogen-containing methyl silicone oil, silicone grease, polyethylene wax, 2-methoxyethyl acrylate, n-propyl acrylate, toluene, n-butanol, polyvinyl alcohol, butanone, isopropanoic acid, 3-indole propionic acid, and carboxymethyl cellulose.

Optionally, the metallic lithium strip has a thickness ranging from 10 to 100 μm, and preferably from 10 to 50 μm.

Optionally, the rolling and laminating of the metallic lithium strip is carried out after the dispersion is applied onto the supporting layer and before the applied dispersion is dried.

Optionally, the rolling comprises cold rolling, hot rolling, and combined rolling, wherein the hot rolling is controlled at a temperature in a range from 60 to 120° C., and the combined rolling preferably comprises performing hot rolling first, and then cold rolling.

Optionally, a pressure for the rolling is in a range from 0.1 to 150 MPa, and preferably from 80 to 120 MPa.

Optionally, the surface of the roller is provided with an anti-adhesion material, wherein the anti-adhesion material comprises polyethylene, polyformaldehyde, an organosilicon polymer, and a ceramic.

Optionally, a roller with a maximum tension ranging from 0.1 to 10 N is used for winding, wherein the supporting roller itself is powered.

In the present disclosure, by controlling the rolling process, a laminate with an ultra-thin lithium film is obtained by a simple process, wherein the metallic lithium film has a smooth surface, and there is an artificial SEI layer at the interface between the ultra-thin lithium film and the supporting layer. The laminate can be easily transferred to the negative electrode of a lithium battery, and has an improved prelithiation effect, thereby achieving the effects of high energy density and long cycle life of the battery.

ABBREVIATION

P Substrate
N Blank region
L Metallic lithium layer
PL (Continuous) lithium foil
PNL Intermittent lithium foil

DETAILED DESCRIPTION

In order to make the objects, technical solutions and advantages of the present disclosure more clear, the present disclosure will be further described in detail below with reference to the drawings and embodiments. It should be understood that the specific embodiments described herein are only used to explain the present disclosure, but not to limit the present disclosure. In addition, the technical features involved in the embodiments of the present disclosure as described below can be combined with each other as long as they do not conflict with each other.

Figure 1:
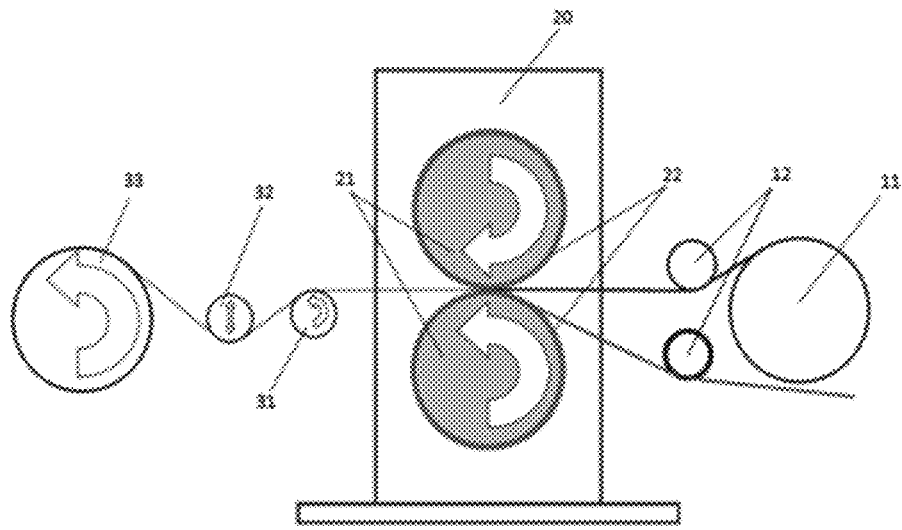
FIG. 1 is a schematic diagram of a process for preparing a continuous ultra-thin lithium film laminate by pressure laminating according to the present disclosure.

FIG. 1 shows a schematic diagram of a process for preparing a continuous ultra-thin lithium film preform by pressure laminating according to the present disclosure. As shown in FIG. 1, a metallic lithium strip and a supporting strip are used as raw materials, and an unwinding device is used for unwinding. The unwinding device at least comprises an unwinding roller 11 for the metallic lithium strip and two unwinding supporting rollers 12 for supporting unwound metallic lithium strip and unwound supporting strip respectively. The lithium strip and supporting strip as raw materials enter into a rolling mill 20 after passing through the unwinding supporting roller 12. The rolling mill 20 at least comprises a pair of rollers 21 and anti-adhesion coatings 22 on the rollers 21. The rolling pressure of the rolling mill 20 and the roller gap between the rollers 21 may be fine-tuned. A material for the anti-adhesion coatings 22 on the rollers 21 may be one or more selected from the group consisting of polyethylene, polyformaldehyde, an organosilicon polymer, a ceramics, and the like. The supporting strip and the lithium strip are bound together through pressure laminating to form an ultra-thin lithium film preform product. The rolling mill 20 is provided with a winding device at its outlet side. The winding device at least comprises a supporting roller 31, a tension control roller 32, and a winding roller 33. Here, the supporting roller 31 is powered, and may pull the ultra-thin lithium film preform forward with a tiny pulling force. The tension control roller 32 may move up and down or swing, such that not only the tension of the preform may be controlled, but also the winding speed of the winding roller 33 may be controlled according to the height or swing angle of the tension control roller 32.

Figure 2:
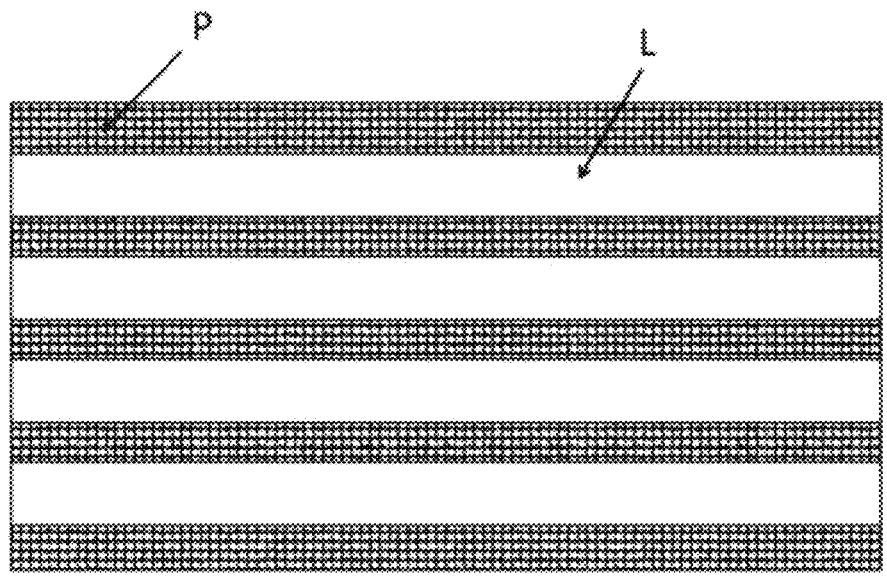
FIG. 2 is a schematic diagram of an ultra-thin lithium film laminate intermittent in the width direction.
Figure 3:
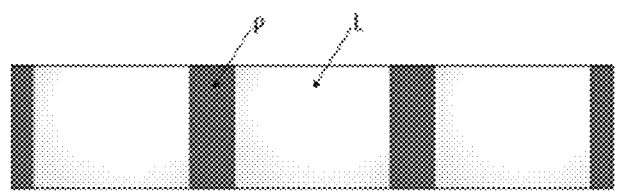
FIG. 3 is a schematic diagram of an ultra-thin lithium film laminate intermittent in the length direction.

FIG. 2 is a schematic diagram of a lithium film laminate intermittent in the width direction, and FIG. 3 is a schematic diagram of a lithium film laminate intermittent in the length direction.

Figure 4:
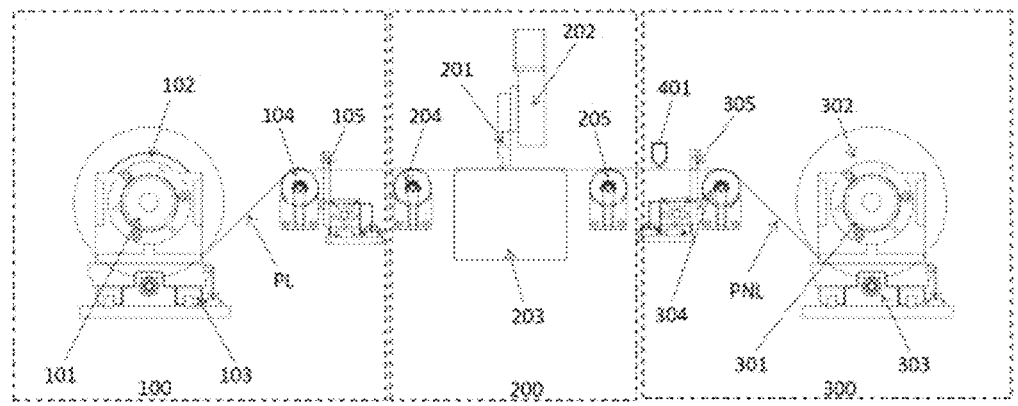
FIG. 4 shows a schematic diagram of a process for preparing an intermittent ultra-thin lithium film laminate.

FIG. 4 is a manufacture device for preparing an intermittent lithium film laminate. The manufacture device for preparing an intermittent lithium film laminate comprises an unwinding device 100, a scraping device 200, and a winding device 300, as well as a control device (not shown) for controlling the winding speed and the operating time interval of the scraping device. Here, the unwinding device 100 comprises an unwinding shaft 101, a magnetic powder brake 102, an unwinding supporting roller 104, an unwinding rectification detection sensor 105 and an unwinding rectification device 103. The scraping device 200 comprises a scraper 201, a scraper driving device 202, a scraper bottom plate 203, and supporting rollers (204, 205). The winding device 300 comprises a winding shaft 301, a winding motor 302, a winding rectification device 303, a winding supporting roller 304, and a winding rectification detection sensor 305. Optionally, a length measurement sensor 401 is further provided.

The unwinding shaft 101 on the unwinding device 100 is used for unwinding the lithium foil PL, and the magnetic powder brake 102 connected with the unwinding shaft 101 may control the tension for unwinding. The unwinding supporting roller 104 is used to support the lithium foil PL such that the lithium foil PL enters into the scraping device 200 at a constant tilt angle, facilitating the accurate rectification detection on the lithium foil PL by the unwinding rectification detection sensor 105. The supporting rollers 204, 205 on the scraping device 200 ensure that the tilt angles, at which the strip enters and leaves the device, are constant and not affected by other process steps respectively. The scraper bottom plate 203 is used to support the lithium foil PL and maintain the lithium foil PL in a flat state. The scraper driving device 202 is used to drive the scraper 201 to achieve rapid movements in the upward and downward directions. The winding device 300 comprises a winding shaft 301 and a winding motor 302. The winding shaft 301 is used for the winding of the intermittent lithium foil PNL, and the winding shaft 301 is driven by the winding motor 302.

Specific application method and procedure are as follows. A battery-grade lithium foil PL supported on a substrate is mounted on the unwinding shaft 101 and fixed. The lithium foil PL passes through the unwinding supporting roller 104, the unwinding rectification detection sensor 105, the supporting rollers 204, 205 of the scraping device, the winding rectification detection sensor 305, and the winding supporting roller 304 in sequence, and then is wound onto the winding shaft 301 and fixed. The equipment is turned on, and thus the winding motor 302 on the winding device 300 operates to drive the rotation of the winding shaft 301, such that the lithium foil PL passes through the scraping device 200 from the unwinding device 100, and then is wound. During the winding process by the winding device 300, the scraper 201 is intermittently moved up and down by controlling the scraper driving device 202 in the scraping device 200, such that a portion of the metallic lithium layer on the lithium foil PL is scraped away to form an intermittent lithium foil PNL. The intermittent lithium foil in the width direction is manufactured by controlling the width and number of the scrapers.

Figure 5:
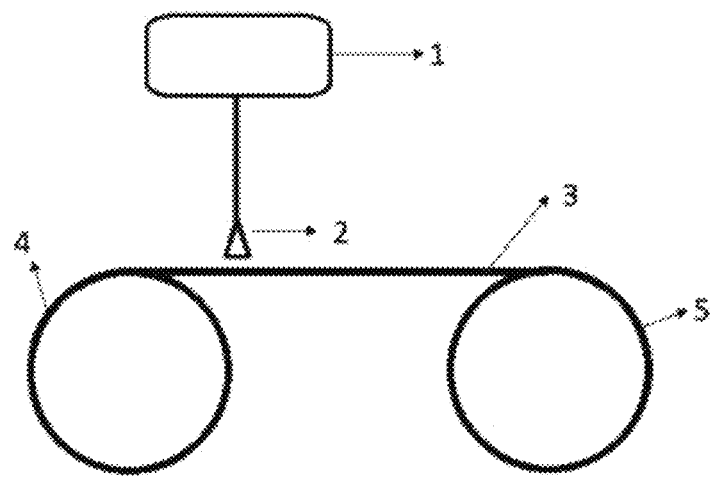
FIG. 5 shows a schematic diagram of a process for spray coating a functional agent onto a carrier material.

FIG. 5 is a schematic diagram of a process for spray coating a functional agent onto a carrier material, wherein a formulated solution is added to a solution tank 1, and a pretreatment is performed on a supporting layer 3 through a spray head 2, so that the functional agent is attached to the supporting layer. The supporting layer is unwound and wound by the unwinding roller 4 and winding roller 5 respectively.

Hereinafter, the present disclosure will be described in further detail by way of examples using the above-mentioned process and equipment. The structural parameters of the products, the reactants, and the process conditions used in the following examples are all typical examples, but are demonstrated by the inventors through a large number of experiments. Other structural parameters, other types of reactants, and other process conditions different from those as listed above are also applicable, and can also achieve the technical effects of the present disclosure.

Example 1

Figure 6:
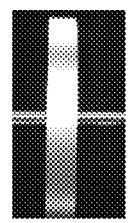
FIG. 6 shows a smooth ultra-thin lithium film laminate product with a thickness of 5 m prepared in Example 1 of the present application.
Figure 8:
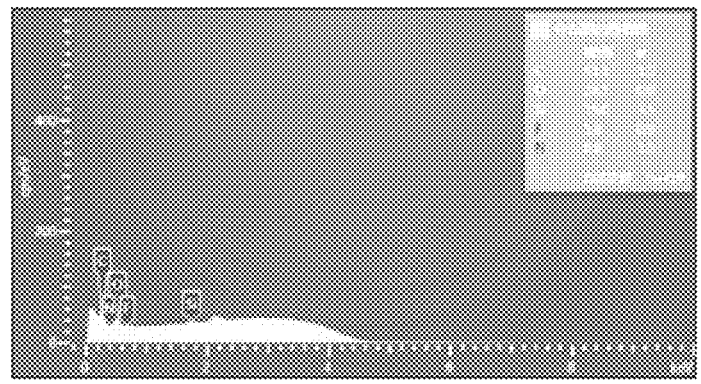
FIG. 8 shows the energy spectrum of the ultra-thin lithium film laminate product of Example 1 of the present application.

A metallic lithium strip with a lithium content of 99.95% and a thickness of 20 μm and a polyethylene film with a thickness of 50 μm (where the surface of the polyethylene film was provided with a functionalized layer, which was formed by spray coating a solution of perfluoro-n-pentane and hydrogen-containing silicone oil in butanone onto the surface to be contacted with metallic lithium) were cold rolled with the aid of the unwinding and winding devices under a controlled pressure of 100 MPa, to obtain an ultra-thin lithium film laminate product (as shown in FIG. 6) having a thickness of 5 μm (with a thickness tolerance of ±0.5 μm) and a smooth surface (which is the surface separated from the supporting layer). The surface energy spectrum is shown in FIG. 8. Peaks of Si, N, and F occurred on the surface, indicating the success of the artificial SEI modification.

Example 2

Figure 7:
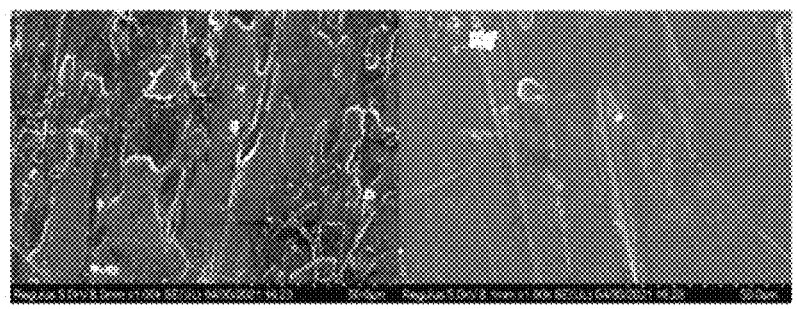
FIG. 7 shows the SEM images of the original 5-μm ultra-thin lithium film laminate product (Comparative Example 1, left panel) and the artificial SEI-modified 5-μm ultra-thin lithium film laminate product (Example 2, right panel).

A metallic lithium strip with a lithium content of 99.95% and a thickness of 20 μm and a polyethylene film with a thickness of 50 μm (where the surface of the polyethylene film was provided with a functionalized layer, which was formed by spray coating a solution of polyphosphoric acid in toluene onto the surface to be contacted with metallic lithium) were hot rolled with the aid of the unwinding and winding devices under a temperature of 80° C. and a controlled pressure of 120 MPa, to obtain an ultra-thin lithium film laminate product (the SEM image is shown in the right panel of FIG. 7) having a thickness of 5 μm (with a thickness tolerance of ±0.5 μm) and a flat surface (which is the surface separated from the supporting layer).

Comparative Example 1

A metallic lithium strip with a lithium content of 99.95% and a thickness of 20 μm and a polyethylene film with a thickness of 50 μm (where the surface of the polyethylene film was provided with a stress controlling layer, which was formed by spray coating a solution of hydrogen-containing silicone oil in toluene to the surface to be contacted with metallic lithium) were hot rolled with the aid of the unwinding and winding devices under a temperature of 80° C. and a controlled pressure of 120 MPa, to obtain an ultra-thin lithium film laminate product (the SEM image is shown in the left panel of FIG. 7) having a thickness of 5 μm (with a thickness tolerance of ±0.5 μm) and a non-flat surface (which is the surface separated from the supporting layer).

Example 3:—Test for Electrical Property

Figure 9:
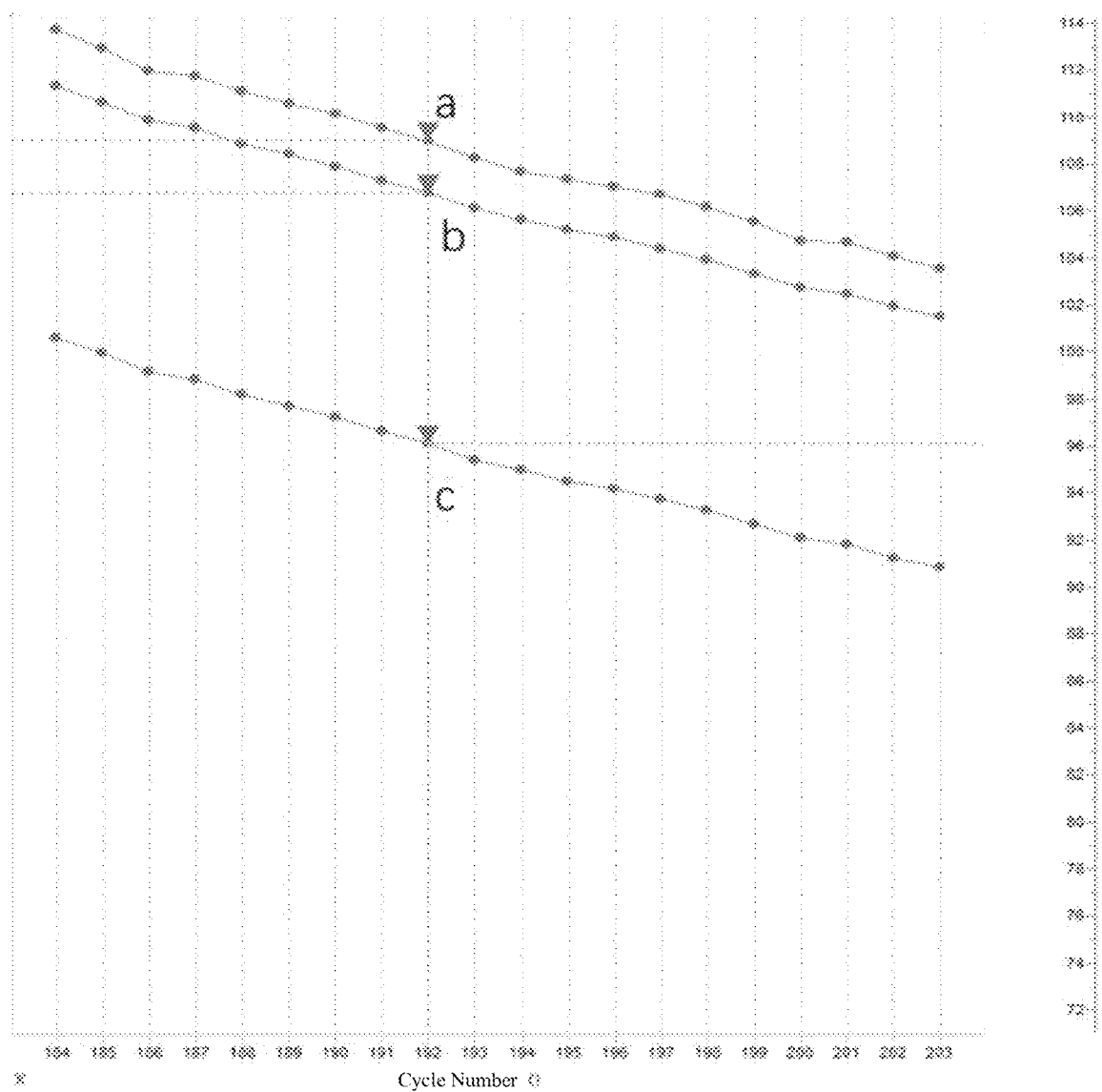
FIG. 9 shows the discharge curves of the ultra-thin lithium film laminate products of Examples 1 and 2 and Comparative Example 2 of the present application.

The 5-μm ultra-thin lithium laminate product obtained in Example 1 was punched into an electrode sheet with a diameter of 15.6 cm. The electrode sheet and a metallic lithium disc were assembled into a half-cell, by using a solution of 1M $LiPF_6$ in EC/DMC/EMC (1/1/1) (Shanshan electrolyte solution) as the electrolyte solution. The discharge data (1C) of the cell indicates that the metallic lithium whose surface was functionally modified exhibits an excellent capacity retention of 89.0% after 200 cycles, as shown by Curve a in FIG. 9.

Example 4:—Test for Electrical Property

The 5-μm ultra-thin lithium laminate product obtained in Example 2 was punched into an electrode sheet with a diameter of 15.6 cm. The electrode sheet and a metallic lithium disc were assembled into a half-cell, by using a solution of 1M $LiPF_6$ in EC/DMC/EMC (1/1/1) (Shanshan electrolyte solution) as the electrolyte solution. The discharge data (1C) of the cell indicates that the metallic lithium whose surface was functionally modified also exhibits an excellent capacity retention of 88.1% after 200 cycles, as shown by Curve b in FIG. 9.

Comparative Example 2

The 5-μm ultra-thin lithium laminate product obtained in Comparative Example 1 was punched into an electrode sheet with a diameter of 15.6 cm. The electrode sheet and a metallic lithium disc were assembled into a half-cell, by using a solution of 1M $LiPF_6$ in EC/DMC/EMC (1/1/1) (Shanshan electrolyte solution) as the electrolyte solution. The discharge data (1C) of the cell indicates that the metallic lithium whose surface was not functionally modified only exhibits a capacity retention of 77% after 200 cycles, as shown by Curve c in FIG. 9, which is much lower than that of the modified metallic lithium.

Example 5—Test of Lithium Compensation for Graphite

A graphite electrode was first prepared as follows. Graphite powder (available from BTR), acetylene black AB (BTR), sodium carboxymethyl cellulose (CMC) (available from Shanghai Haiyi), and styrene butadiene rubber (SBR) (available from Shanghai Haiyi) in a ratio of 94:3:1:2 were dispersed in deionized water with a controlled solid content of 35% and a viscosity of 2000-3000 cp, stirred for 6 h, coated on one side of a 10 μm copper film with a coater, and dried to obtain a 50 μm graphite electrode sheet. Then, the 5-μm ultra-thin lithium laminate product obtained in Example 2 was treated by a stress controlling layer (with a controlled adhesion of 2 N/m). The lithium film was attached and pressure transferred to the surface of the graphite electrode under a pressure of 15 MPa. After peeling off the supporting layer, the graphite electrode with the lithium film was punched into an electrode sheet with a diameter of 15.6 cm. The electrode sheet and a lithium film were assembled into a half-cell, by using a solution of 1M LiPF$_6$ in EC/DMC/EMC (1/1/1) (Shanshan electrolyte solution) as the electrolyte solution. As compared to the half-cell without prelithiation, in the half-cell where the graphite negative electrode was prelithiated by using the ultra-thin lithium laminate, the first efficiency of the graphite negative electrode was increased from 91.8% to 100%. That is, the first efficiency was greatly improved. Moreover, the capacity did not degrade after 1500 cycles.

It should be understood that the embodiments as described above are only preferred embodiments of the present disclosure, but not intended to limit the present disclosure. Any variation, equivalent replacement, and modification made within the spirit and principle of the present disclosure shall be encompassed within the scope of the present disclosure.

What is claimed is:

1. An ultra-thin lithium film laminate, comprising:
   a supporting layer; and
   an ultra-thin lithium film on at least one surface of the supporting layer and bound to the supporting layer, wherein the ultra-thin lithium film is a uniform thin film having a through-hole with a pore size ranging from 5 to 200 μm and having a uniform thickness ranging from 0.5 to 20 μm, with a thickness tolerance within +0.5 μm,
   wherein there is a solid electrolyte interface layer at an interface between the ultra-thin lithium film and the supporting layer,
   a material for the supporting layer comprises at least one selected from the group consisting of a polymer, an inorganic oxide, and an inorganic conductor, wherein the polymer is selected from the group consisting of a polyimide, nylon, cellulose, a high-strength thin-film polyolefin, and a polyester; the inorganic oxide comprises aluminum oxide; and the inorganic conductor is selected from the group consisting of graphite, carbon nanotubes, and graphene,
   the solid electrolyte interface layer comprises a reaction product between metallic lithium and a material capable of reacting with metallic lithium, and a stress-adjusting material,
   the material capable of reacting with metallic lithium comprises at least one selected from the group consisting of perfluoro-n-pentane and polyphosphoric acid,
   the stress-adjusting material is one selected from the group consisting of poly (dimethylsiloxane), hydrogen-containing silicone oil, punching shear oil, methyl silicone oil, emulsified methyl silicone oil, hydrogen-containing methyl silicone oil, silicone grease, and polyethylene wax, and
   an adhesion between the ultra-thin lithium film and the supporting layer is in a range from 0.1 to 10 N·m$^{-1}$.

2. The ultra-thin lithium film laminate according to claim 1, wherein a material for forming the ultra-thin lithium film comprises metallic lithium or a lithium alloy, wherein the lithium alloy is an alloy of lithium with at least one of silicon, magnesium, aluminum, indium, boron, tin, gallium, yttrium, silver, copper, lead, bismuth, sodium, carbon, germanium, titanium, chromium, cobalt, tungsten, iron, niobium, nickel, gold, barium, cadmium, cesium, calcium, manganese, nitrogen, platinum, sulfur, thallium, strontium, tellurium, zinc, antimony, and zirconium.

3. The ultra-thin lithium film laminate according to claim 1, wherein the solid electrolyte interface layer comprises one or more of lithium carbonate, lithium oxide, lithium hydroxide, lithium nitride, lithium fluoride, lithium phosphate, and alkyl lithium.

4. The ultra-thin lithium film laminate according to claim 1, wherein the ultra-thin lithium film satisfies at least one of the following requirements:
   the through-hole has a circular or quasi-circular shape;
   the through-hole has a spacing ranging from 5 to 1000 μm; and
   the ultra-thin lithium film has a thickness ranging from 1 to 10 μm.

5. The ultra-thin lithium film laminate according to claim 1, wherein the supporting layer has a single layer structure or a multi-layer laminate structure.

6. The ultra-thin lithium film laminate according to claim 1, wherein the ultra-thin lithium film laminate is in a strip form, wherein the ultra-thin lithium film is intermittent in a length direction, or is intermittent in a width direction.

7. The ultra-thin lithium film laminate according to claim 6, wherein
   the ultra-thin lithium film intermittent in the length direction comprises a blank region and a metallic lithium layer region both with a controllable length, wherein the metallic lithium layer region has a length in a range from 1 to 2000 mm, and the blank region has a length in a range from 1 to 200 mm; or
   the lithium film intermittent in a width direction comprises an ultra-thin lithium film portion with a width ranging from 1 to 200 mm and a lithium film-free portion with a width ranging from 0.5 to 10 mm.

8. The ultra-thin lithium film laminate according to claim 1, wherein the ultra-thin lithium film laminate is in a strip form, wherein the ultra-thin lithium film is continuous in a length direction, or is continuous in a width direction.

* * * * *